(12) United States Patent
Arakawa et al.

(10) Patent No.: US 7,532,005 B2
(45) Date of Patent: May 12, 2009

(54) ROTATION ANGLE DETECTION APPARATUS

(75) Inventors: Toru Arakawa, Hyogo (JP); Masaru Shimizu, Kyoto (JP); Masami Segawa, Osaka (JP)

(73) Assignee: Panasonic Corporation, Osaka (JP)

( * ) Notice: Subject to any disclaimer, the term of this patent is extended or adjusted under 35 U.S.C. 154(b) by 139 days.

(21) Appl. No.: 11/730,478

(22) Filed: Apr. 2, 2007

(65) Prior Publication Data
US 2007/0241742 A1 Oct. 18, 2007

(30) Foreign Application Priority Data
Apr. 14, 2006 (JP) .............................. 2006-111772

(51) Int. Cl.
G01B 7/30 (2006.01)

(52) U.S. Cl. .................................. 324/207.25; 33/1 PT

(58) Field of Classification Search ............ 324/207.25, 324/207.22, 207.23; 33/1 PT, 1 N; 702/151; 250/231.13–231.18; 341/11, 13, 14; 356/614, 356/615

See application file for complete search history.

(56) References Cited

U.S. PATENT DOCUMENTS 6,341,426 B1 * 1/2002 Okumura ..................... 33/1 PT
6,552,533 B2 * 4/2003 Schodlbauer et al. .. 324/207.22

FOREIGN PATENT DOCUMENTS

WO 99/12796 3/1999

\* cited by examiner

*Primary Examiner*—Kenneth J Whittington
(74) *Attorney, Agent, or Firm*—Wenderoth, Lind & Ponack, L.L.P.

(57) ABSTRACT

A rotation angle detection apparatus includes a main rotatable body, a pair of sub rotatable bodies, and a control circuit. The sub rotatable bodies are rotated in a linked motion with the rotation of the main rotatable body and are overlapped with each other. The control circuit detects a rotation angle from a rotation of one of the sub rotatable bodies, and detects a rotation phase difference between the rotation of one sub rotatable body and the rotation of the other sub rotatable body of the pair of the sub rotatable bodies. From the two detected signals, the control circuit calculates a rotation angle of the main rotatable body.

6 Claims, 5 Drawing Sheets rotation angle of main rotatable body rotation angle of main rotatable body

ROTATION ANGLE DETECTION APPARATUS

BACKGROUND OF THE INVENTION

1. Field of the Invention

The present invention relates to a rotation angle detection apparatus used for detecting a rotation angle of a steering part of a vehicle, and the like.

2. Background Art

Recently, rotation angle detection apparatuses for detecting a rotation angle of a steering part that rotates in a linked motion with the rotation of a steering wheel have been becoming widespread. The rotation angle detection apparatus is used for improving the running stability of a vehicle, automatic operation, assisting a driver in parking a vehicle into a garage, and the like.

In such apparatuses, it is very important to detect a rotation angle of a steering part that is rotated when a driver operates a steering wheel. In particular, apparatuses having an accurate detection angle precision and capable of detecting an absolute angle have been demanded.

Such a conventional rotation angle detection apparatus is described with reference to FIGS. 5 and 6.

FIG. 5 is a plan view showing a conventional rotation angle detection apparatus 60. Rotation angle detection apparatus 60 includes main rotatable body 61 having gear 61A on the periphery thereof. In the center of main rotatable body 61, a steering part (not shown) is inserted. Main rotatable body 61 is locked to this steering part.

Rotation angle detection apparatus 60 further includes sub rotatable bodies 62 and 63 engaged with main rotatable body 61. Sub rotatable bodies 62 and 63 respectively have gears 62A and 63A whose numbers of teeth are slightly different from each other. Gears 62A and 63A mesh with gear 61A in different positions of main rotatable body 61. Furthermore, sub rotatable bodies 62 and 63 have angle detection parts 64 and 65, respectively.

Angle detection part 64 includes magnet M1 placed on the upper surface of sub rotatable body 62 and magnetic sensor S1 disposed so as to face the lower surface of sub rotatable body 62. Similarly, angle detection part 65 includes magnet M2 placed on the upper surface of sub rotatable body 63 and magnetic sensor S2 disposed so as to face the lower surface of sub rotatable body 63.

Angle signals transmitted from angle detection parts 64 and 65 are input into a control circuit (not shown). Thus, rotation angle detection apparatus 60 is constructed.

Next, an operation of rotation angle detection apparatus 60 is described.

When a user rotates a steering part, main rotatable body 61 is rotated according to the rotation of the steering part. According to the rotation of main rotatable body 61, sub rotatable bodies 62 and 63 meshing with gear 61A of main rotatable body 61 are also rotated. According to the rotation of sub rotatable bodies 62 and 63, magnets M1 and M2 placed on the upper surface of sub rotatable bodies 62 and 63 are rotated, respectively. Magnetic sensors S1 and S2 for detecting magnetism detect the rotation of magnets M1 and M2, respectively. The control circuit carries out processing of these two detection signals and the numbers of teeth of sub rotatable bodies 62 and 63, and thereby a rotation angle of main rotatable body 61 is detected. Conventionally, a rotation angle of a steering part has been detected in this way.

Note here that the number of teeth of sub rotatable body 62 is set to be 1/3 of that of main rotatable body 61 and the number of teeth of sub rotatable body 62 is set to be slightly different from that of sub rotatable body 63. Therefore, as shown in voltage waveform in FIG. 6, the phase of the signal detected by magnetic sensor S1 is slightly different from the phase of the signal detected by magnetic sensor S2.

For example, when main rotatable body 61 rotates by rotation angle X1, voltage V1 of magnetic sensor S1 and voltage V2 of magnetic sensor S2 are input into the control circuit. The control circuit carries out processing of the two voltage values V1 and V2 and the numbers of teeth of sub rotatable bodies 62 and 63, and thereby rotation angle X1 is detected.

A prior art technology relating to the invention of this application is disclosed in, for example, International Publication WO 99/12796.

However, in the above-mentioned conventional rotation angle detection apparatus 60, the detection of a rotation angle by the control circuit requires complicated processing. Furthermore, when there is a difference in sensitivity between magnetic sensor S1 and magnetic sensor S2, since the difference between peak values of S1 and S2 shown in FIG. 6 occurs, error in the measured angle may occur. Therefore, the sensitivities of two magnetic sensors S1 and S2 have to be matched to each other precisely.

SUMMARY OF THE INVENTION

A rotation angle detection apparatus includes a main rotatable body, a pair of sub rotatable bodies and a control circuit. The sub rotatable bodies are rotated in a linked motion with the rotation of the main rotatable body, and overlapped with each other. The control circuit detects a rotation angle from one of the sub rotatable bodies, simultaneously detects a phase difference of rotation between the rotations of the pair of sub rotatable bodies, and calculates a rotation angle of the main rotatable body from the two detected signals. Thus, the present invention can provide a rotation angle detection apparatus capable of easily carrying out processing by the control circuit.

Additional objects and advantages of the present invention will be apparent from the following detailed description of preferred embodiments thereof, which are best understood with reference to the accompanying drawings.

DETAILED DESCRIPTION OF THE INVENTION

Hereinafter, embodiments of the present invention are described with reference to FIGS. 1 to 4.

Figure 1:
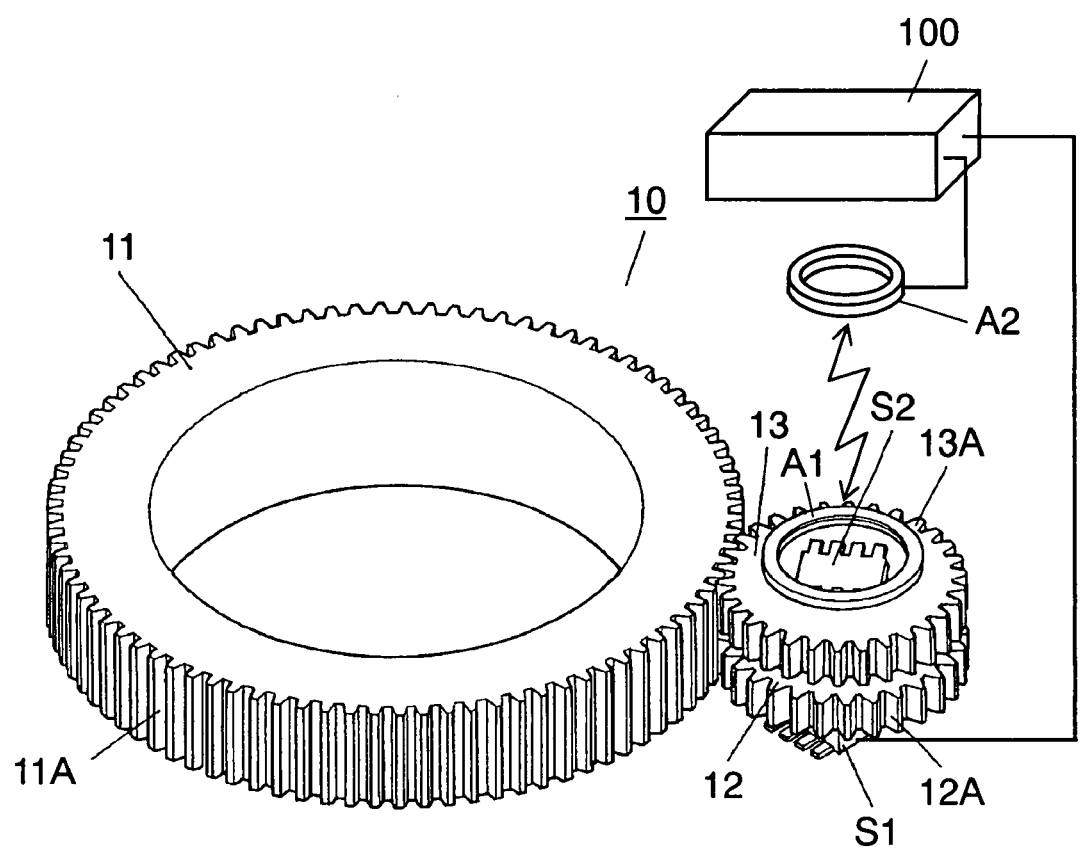
FIG. 1 is a perspective view showing a rotation angle detection apparatus in accordance with one embodiment of the present invention.
Figure 2:
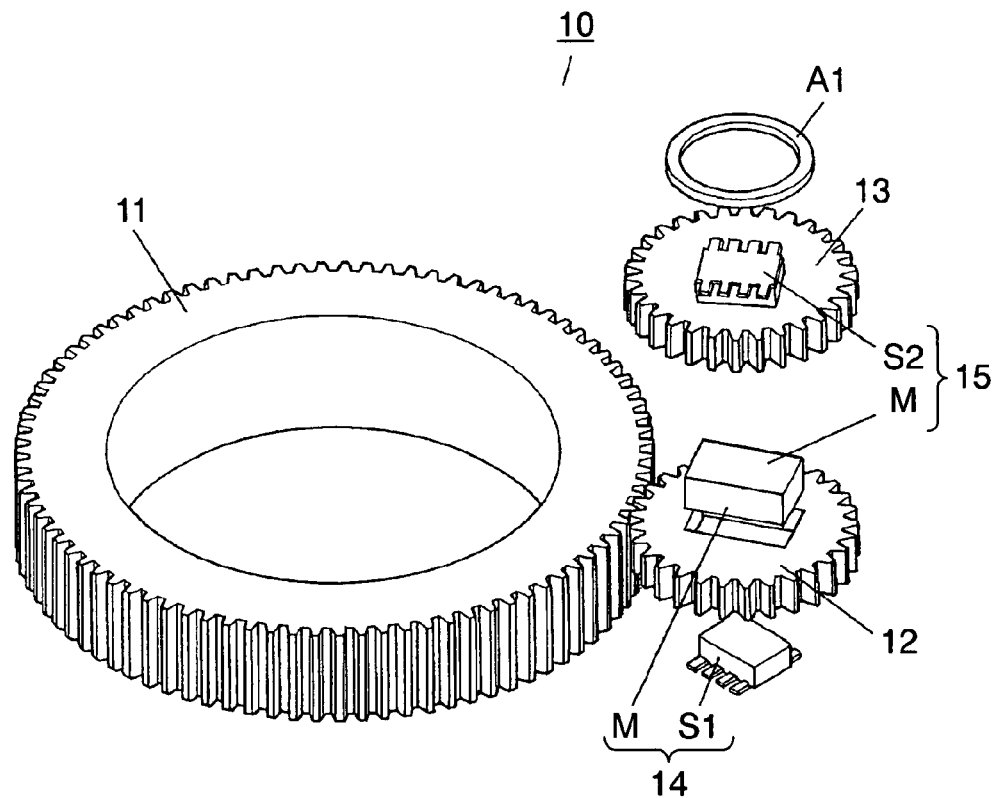
FIG. 2 is an exploded perspective view showing the rotation angle detection apparatus in accordance with the embodiment of the present invention shown in FIG. 1.

FIGS. 1 and 2 are views to illustrate a rotation angle detection apparatus in accordance with one embodiment of the present invention. Rotation angle detection apparatus 10 includes main rotatable body 11 having gear 11A on the periphery. In an opening in the center of main rotatable body 11, a steering part is inserted. Main rotatable body 11 is locked to the steering part.

Rotation angle detection apparatus 10 further includes first sub rotatable body 12 having gear 12A and second sub rotatable body 13 having gear 13A. Herein, a number of teeth of gear 12A is set to be slightly different from that of gear 13A. Herein, "slightly different" means that a difference of the numbers of teeth is one to three. Furthermore, gears 12A and 13A mesh with upper and lower positions in the same portion of gear 11A of main rotatable body 11. That is to say, first sub rotatable body 12 and second sub rotatable body 13 have the same outer diameter and a common rotation axis.

On the upper surface of first sub rotatable body 12, magnet M is placed. On the lower surface of first sub rotatable body 12, magnetic sensor (first magnetic sensor) S1 such as a magnetic resistance device is disposed so as to face magnet M. Similarly, on the upper surface of second sub rotatable body 13, magnetic sensor (second magnetic sensor) S2 and transmit antenna A1 coupled to magnetic sensor S2 are placed. Magnetic sensor S2 faces magnet M. Furthermore, above transmit antenna A1, feed antenna A2 disposed so as to face transmit antenna A1 is provided. Feed antenna A2 is coupled to control circuit 100.

Transmit antenna A1 and feed antenna A2 are each made of a wound coil.

Angle detection part 14 includes magnet M and magnetic sensor S1. Phase detection part 15 includes magnet M and magnetic sensor S2. A phase difference signal of magnetic sensor S2 is communicated between transmit antenna A1 and feed antenna A2 in a non-contact way. Furthermore, electric power is supplied from feed antenna A2 to magnetic sensor S2 via transmit antenna A1.

Therefore, first sub rotatable body 12 and second sub rotatable body 13 do not necessarily have a common rotation axis as long as they are overlapped with each other so that magnetic sensor S1 and magnetic sensor S2 can detect the rotation of magnet M. The phrase "being overlapped with each other" in the present invention includes following cases: a case in which one sub rotatable body includes the entire area of the other sub rotatable body, and a case in which a part of the periphery of one sub rotatable body is protruded to the outside of the area of the other sub rotatable body.

Then, an angle signal of magnetic sensor S1 and a phase difference signal of magnetic sensor S2 transmitted via transmit antenna A1 and feed antenna A2 are input into control circuit 100.

Thus, the rotation angle detection apparatus 10 of this embodiment is configured as described above. Next, an operation thereof is described.

Figure 3:
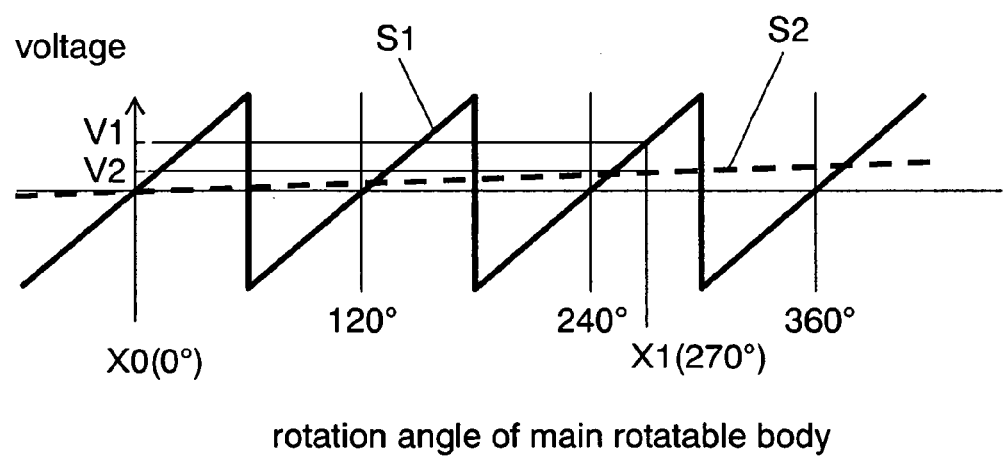
FIG. 3 is a characteristic graph of the rotation angle detection apparatus in accordance with the embodiment of the present invention shown in FIG. 1.

When a user operates a steering part, main rotatable body 11 is rotated according to the rotation of the steering part. According to the rotation of main rotatable body 11, first sub rotatable body 12 and second sub rotatable body 13, which mesh with gear 11A, are also rotated, respectively. Magnetic sensor S1 detects magnetism of magnet M placed on first sub rotatable body 12. Since the number of teeth of first sub rotatable body 12 is ⅓ of the number of teeth of main rotatable body 11, an angle signal having a sawtooth waveform shown by a solid line in a voltage waveform diagram of FIG. 3 is output from magnetic sensor S1.

At the same time, a rotation angle corresponding to the difference between the number of teeth of first sub rotatable body 12 and the number of teeth of second sub rotatable body 13 is detected as a phase difference. When magnetic sensor S2 placed on second sub rotatable body 13 measures the magnetism of magnet M placed on first sub rotatable body 12, this phase difference is detected. Since the number of teeth of first sub rotatable body 12 is slightly different from that of second sub rotatable body 13, phase difference signal S2 shown by a broken line in the voltage waveform diagram of FIG. 3 is output as a detected signal from magnetic sensor S2. This voltage waveform shows a gradually increasing or decreasing line.

For example, a case in which the number of teeth of first sub rotatable body 12 is [m], and the number of teeth of second sub rotatable body 13 is [m−1] is described.

When first sub rotatable body 12 is rotated once, second sub rotatable body 13 is rotated so that one more teeth of second sub rotatable body 13 rotates as compared with the teeth of first sub rotatable body 12. The phase difference signal at this time is obtained when magnetic sensor S2 detects the magnetism of magnet M. That is to say, magnetic sensor S2 detects the difference in rotation corresponding to the number of teeth between first sub rotatable body 12 and second sub rotatable body 13, that is, a phase difference.

When the rotation angle of main rotatable body 11 is X1, voltage V1 of magnetic sensor S1 and voltage V2 of magnetic sensor S2 are input into control circuit 100. Control circuit 100 detects rotation angle X1 by carrying out processing of the input two voltage values V1 and V2.

That is to say, firstly, control circuit 100 detects an approximate rotation angle position from voltage V2 of magnetic sensor S2 transmitted via antenna A1 and antenna A2. Next, control circuit 100 detects the detailed rotation angle position in the above-mentioned approximate rotation angle from voltage V1 of magnetic sensor S1. By carrying out processing of these two detected signals, a detailed rotation angle of main rotatable body 11 is detected. Herein, the approximate detection of a rotation angle corresponds to detecting how many times main rotatable body 11 has rotated. For example, when it is detected that the rotation of main rotatable body 11 is the second rotation, the detailed detection of the rotation angle corresponds to detecting a degree of the angle of the second rotation. In the example shown in FIG. 3, magnetic sensor S2 detects as an approximate rotation angle that the rotation of main rotatable body is the first rotation. Furthermore, magnetic sensor S1 detects that detailed rotation angle is 270°.

Thus, rotation angle detection apparatus 10 in accordance with this embodiment can precisely detect a rotation angle of main rotatable body 11 from two detected signals obtained from magnetic sensor S1 and magnetic sensor S2. As a result, the processing of control circuit 100 becomes easy. Furthermore, one magnetic sensor detects an approximate angle of the main rotatable body and the other magnetic sensor detects a detailed rotation angle of the main rotatable body. That is to say, in this configuration, since two magnetic sensors output detected signals that are independent from each other, it is not necessary to match the sensitivities of the two magnetic sensors. Therefore, it is possible to reduce man-hours for matching sensitivities.

This embodiment describes a configuration as an example, in which first sub rotatable body 12 and second sub rotatable body 13 are overlapped with each other so that they have the same outer diameter and the same rotation axis. However, the configuration is not limited to this alone. That is to say, any configuration may be employed as long as the magnetism of magnet M placed on first sub rotatable body 12 can be detected by magnetic sensor S2 placed on second sub rotatable body 13. In such a configuration range, since first sub rotatable body 12 and second sub rotatable body 13 can be disposed in a way in which they are overlapped with each other, they may have different outer shapes from each other, or may not have a common rotation axis.

Figure 4:
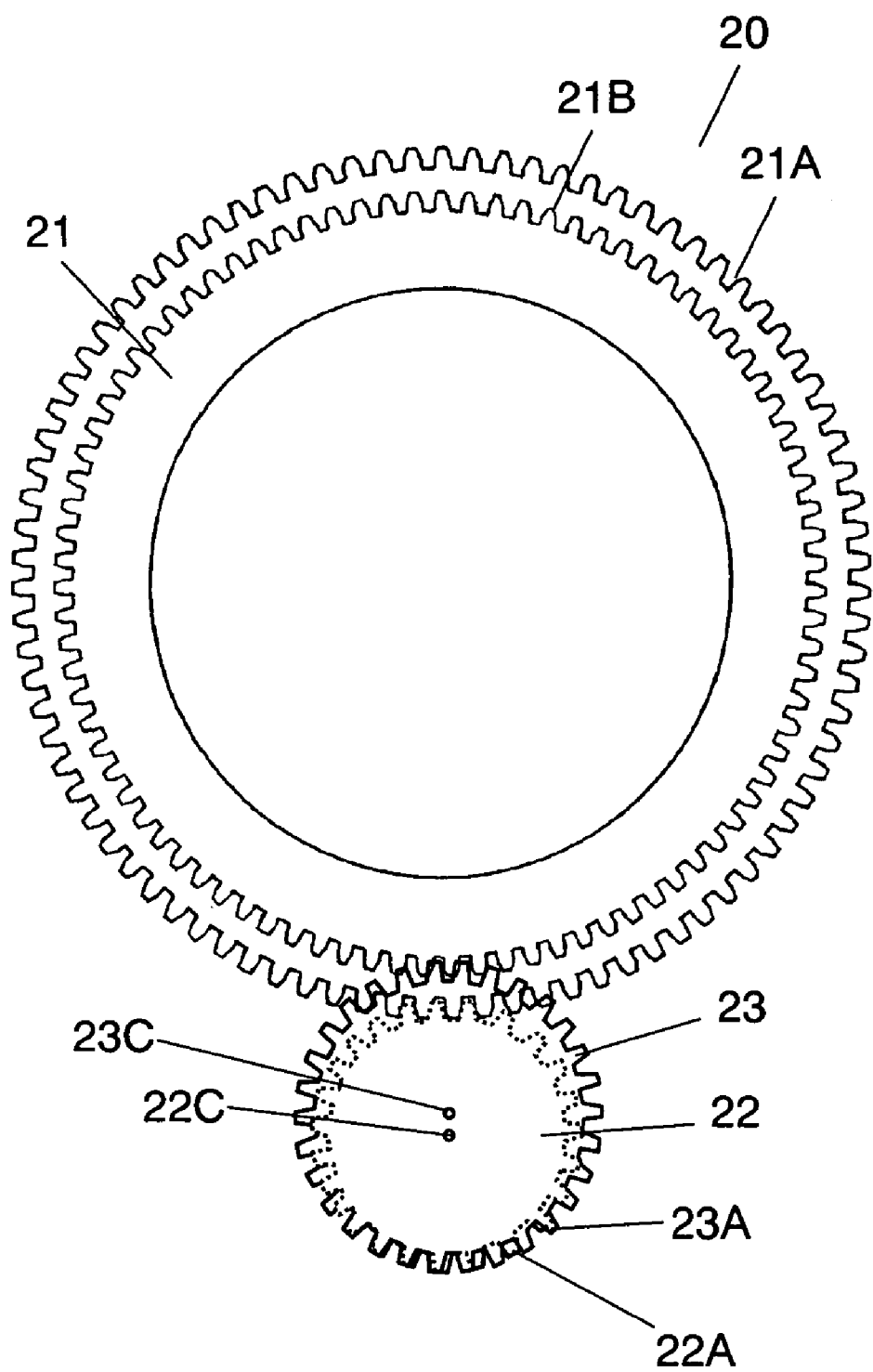
FIG. 4 is a plan view showing a principal part of a rotation angle detection apparatus in accordance with another embodiment of the present invention.
Figure 5:
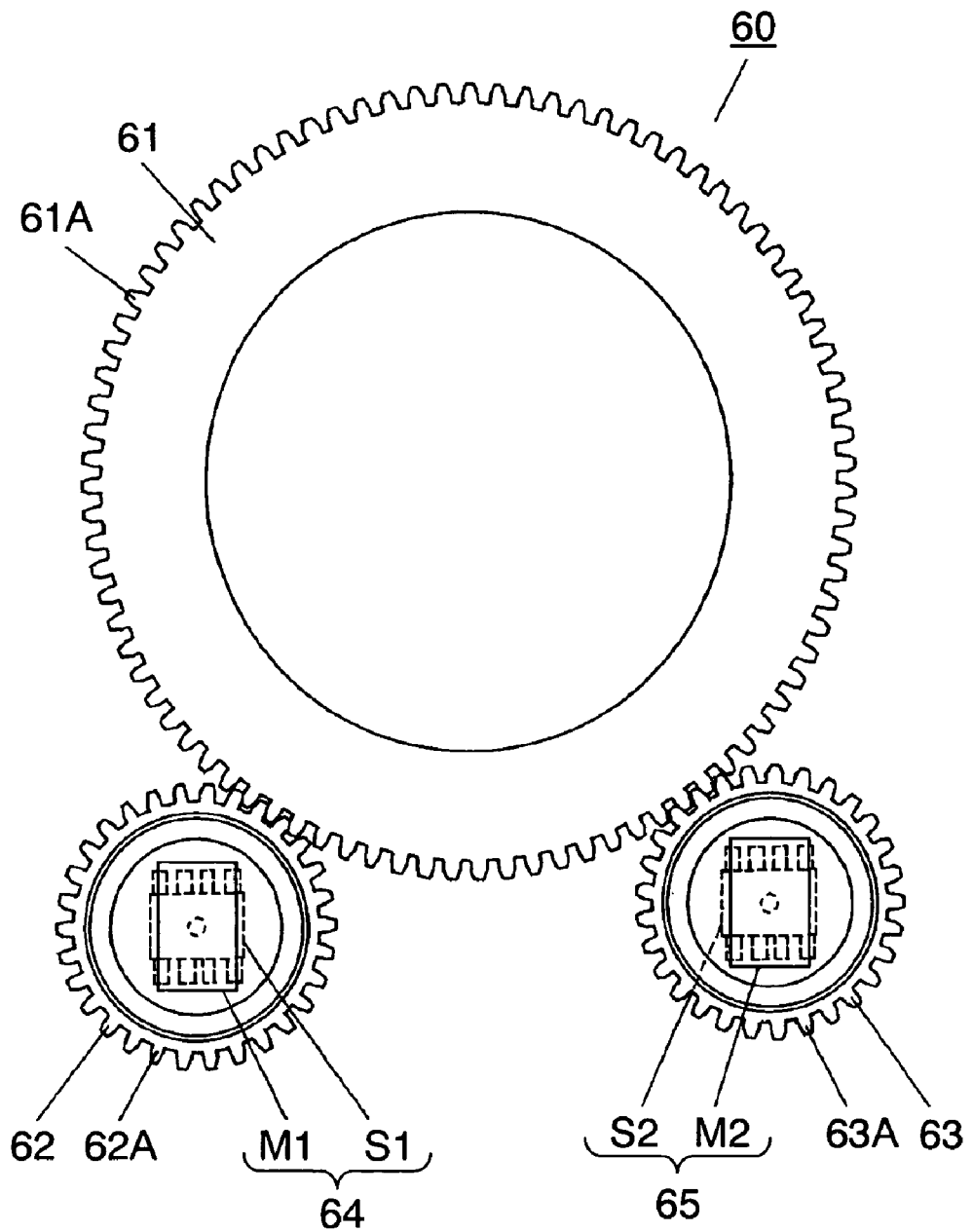
FIG. 5 is a plan view showing a conventional rotation angle detection apparatus.
Figure 6:
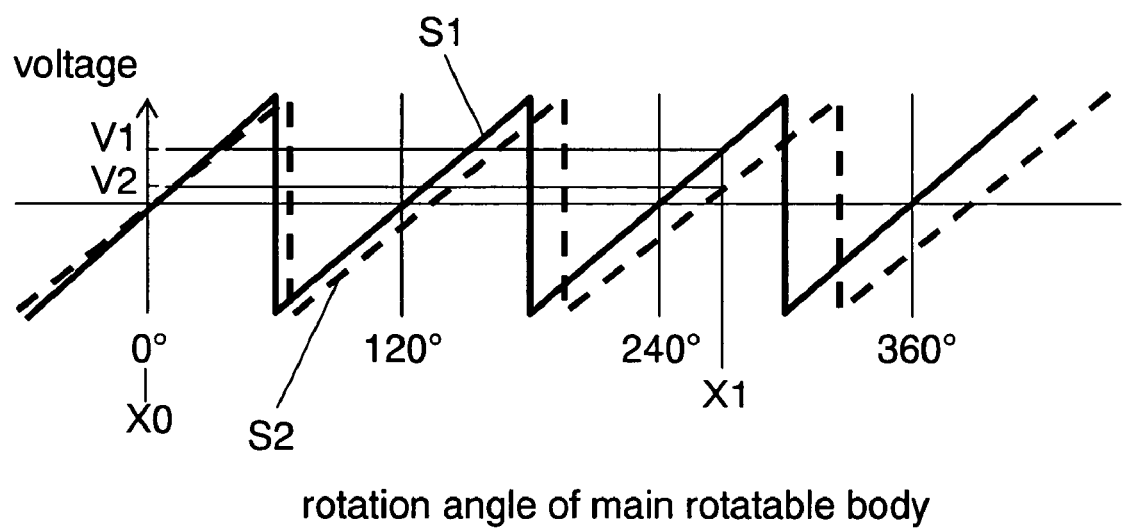
FIG. 6 is a characteristic graph of a conventional rotation angle detection apparatus.

Rotation angle detection apparatus 20 in accordance with another embodiment is shown in FIG. 4. Rotation angle detection apparatus 20 includes gear 21A and gear 21B formed in upper and lower stages on the periphery of main rotatable body 21. Gear 21B in the upper stage has a smaller outer diameter than gear 21A in the lower stage does. For example, the number of teeth of gear 21B is smaller by two teeth than that of gear 21A.

First sub rotatable body 22 having central axis 22C and outer diameter D1 has gear 22A. Gear 22A meshes with gear 21A in the lower stage. Furthermore, second sub rotatable body 23 having central axis 23C and outer diameter D2 has gear 23A. Gear 23A meshes with gear 21B in the upper stage. First sub rotatable body 22 and second sub rotatable body 23 do not share a central axis but they are overlapped with each other so that smaller first sub rotatable body 22 is included in the area of larger second sub rotatable body 23.

That is to say, in the above-mentioned configuration, first sub rotatable body 22 and second sub rotatable body 23 have different rotation axes, but they are almost overlapped with each other. In this way, since two sub rotatable bodies are almost overlapped with each other, space for the apparatus can be reduced.

As mentioned above, the rotation angle detection apparatus of the present invention is configured so that the first and second sub rotatable bodies are almost overlapped with each other. The first sub rotatable body detects an angle. On the other hand, the first and second sub rotatable bodies detect a phase difference. Thus, since the control circuit can detect the precise rotation angle of a steering part from the two detected signals, the rotation angle detection apparatus of the present invention is useful as a rotation angle detection apparatus for detecting a rotation angle of a steering part of a vehicle.

In the description of this embodiment, the main rotatable body, the first sub rotatable body and the second sub rotatable body are gears. However, these rotatable bodies are not necessarily limited to gears. For example, these rotatable bodies can be produced by using hard rubber rollers such that two sub rotatable bodies made of the rubber engage with main rotatable body made of the rubber. In order to prevent the first sub rotatable body and the second sub rotatable body from slipping with respect to the main rotatable body, a contacting surface of the roller may be roughened or processed into a wave shape. In this case, the outer diameter of the first sub rotatable body is set to be different from the outer diameter of the second sub rotatable body. Thereby, every time the main rotatable body rotates once, a predetermined rotation phase difference can be given between the two sub rotatable bodies.

A rotation angle detection apparatus of the present invention includes a main rotatable body, a first sub rotatable body and a second sub rotatable body, which are rotated in a linked motion with the rotation of the main rotatable body and are overlapped with each other, and a control circuit. The control circuit carries out processing of an angle detection signal detected from the first sub rotatable body and a phase difference detection signal detected from the first sub rotatable body and the second sub rotatable body. By carrying out processing of these two detected signals, the control circuit detects the rotation angle of the main rotatable body. That is to say, by a phase difference detection signal, an approximate rotation angle of the main rotatable body is calculated. Furthermore, based on the calculated approximate rotation angle, a detailed rotation angle can be detected by an angle detection signal.

It will be obvious to those skilled in the art that various changes may be made in the above-described embodiments of the present invention. However, the scope of the present invention should be determined by the following claims.

What is claimed is:

1. A rotation angle detection apparatus comprising:
   a main rotatable body;
   a first sub rotatable body and a second sub rotatable body which are rotated in a linked motion with a rotation of the main body, and are overlapped with each other;
   an angle detection part for detecting a rotation angle of the first sub rotatable body;
   a phase difference detection part for detecting a phase difference between a rotation of the first sub rotatable body and a rotation of the second sub rotatable body; and
   a control circuit for carrying out processing of a signal transmitted from the angle detection part and a signal transmitted from the phase difference detection part, and calculating a rotation angle of the main rotatable body;
   wherein the angle detection part comprises
      a magnet attached to the first sub rotatable body, and
      a first magnetic sensor facing the magnet; and
   wherein the phase difference detection part comprises
      the magnet, and
      a second magnetic sensor attached to the second sub rotatable body and facing the magnet.

2. The rotation angle detection apparatus of claim 1, wherein
   the main rotatable body, the first sub rotatable body and the second sub rotatable body have gears on the peripheries thereof;
   a number of teeth of the gear of the first sub rotatable body is different from a number of teeth of the gear of the second sub rotatable body; and
   the gear of the main rotatable body meshes with the gears of the first sub rotatable body and the second sub rotatable body.

3. The rotation angle detection apparatus of claim 2, wherein
   the main rotatable body has two stages of gears having different outer diameters on the outer periphery of the main rotatable body,
   the gear of the first sub rotatable body meshes with one gear of the main rotatable body, and
   the gear of the second sub rotatable body meshes with an other another gear of the main rotatable body.

4. The rotation angle detection apparatus of claim 1, wherein
   the first sub rotatable body and the second sub rotatable body have a same outer diameter and have a common rotation axis.

5. The rotation angle detection apparatus of claim 1, further comprising:
   a transmit antenna placed on the second sub rotatable body and coupled to the second magnetic sensor.

6. A rotation angle detection apparatus comprising:
   a main rotatable body;
   a first sub rotatable body and a second sub rotatable body which are rotated in a linked motion with a rotation of the main body, and are overlapped with each other;
   an angle detection part for detecting a rotation angle of the first sub rotatable body;
   a phase difference detection part for detecting a phase difference between a rotation of the first sub rotatable body and a rotation of the second sub rotatable body; and
   a control circuit for carrying out processing of a signal transmitted from the angle detection part and a signal transmitted from the phase difference detection part, and calculating a rotation angle of the main rotatable body;

wherein the main rotatable body, the first sub rotatable body and the second sub rotatable body have gears on the peripheries thereof;

wherein a number of teeth of the gear of the first sub rotatable body is different from a number of teeth of the gear of the second sub rotatable body;

wherein the gear of the main rotatable body meshes with the gears of the first sub rotatable body and the second sub rotatable body;

wherein the main rotatable body has two stages of gears having different outer diameters on the outer periphery of the main rotatable body;

wherein the gear of the first sub rotatable body meshes with one gear of the main rotatable body; and wherein the gear of the second sub rotatable body meshes with another gear of the main rotatable body.

* * * * *